(12) United States Patent
Matsubara et al.

(10) Patent No.: US 10,592,629 B2
(45) Date of Patent: Mar. 17, 2020

(54) OPTIMIZATION APPARATUS AND METHOD OF CONTROLLING THE SAME

(71) Applicant: FUJITSU LIMITED, Kawasaki-shi, Kanagawa (JP)

(72) Inventors: Satoshi Matsubara, Machida (JP); Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/019,866

(22) Filed: Jun. 27, 2018

(65) Prior Publication Data
US 2019/0012409 A1   Jan. 10, 2019

(30) Foreign Application Priority Data

Jul. 5, 2017   (JP) ................. 2017-131719

(51) Int. Cl.
  *G06F 17/50*    (2006.01)
  *G06F 17/17*    (2006.01)
  *G06F 17/11*    (2006.01)
  *G06F 7/58*     (2006.01)

(52) U.S. Cl.
  CPC ............ *G06F 17/505* (2013.01); *G06F 7/588* (2013.01); *G06F 17/11* (2013.01); *G06F 17/17* (2013.01); *G06F 17/5036* (2013.01); *G06F 2217/08* (2013.01); *G06F 2217/78* (2013.01); *G06F 2217/80* (2013.01)

(58) Field of Classification Search
  USPC ....................................................... 716/133
  See application file for complete search history.

(56) References Cited

U.S. PATENT DOCUMENTS

2013/0290763 A1* 10/2013 Katsumata .......... G06F 11/1658
                                                                713/330

FOREIGN PATENT DOCUMENTS

JP        2016-66378          4/2016

OTHER PUBLICATIONS

Japanese Platform for Patent Information English abstract for Japanese Patent Publication No. 2016-66378, published Apr. 28, 2016.

* cited by examiner

*Primary Examiner* — Bryce M Aisaka
(74) *Attorney, Agent, or Firm* — Staas & Halsey LLP

(57) ABSTRACT

When a transition control unit stochastically determines whether to accept one of a plurality of state transitions, using a temperature, an energy change, and a random number, depending on a relative relationship between the energy change and thermal excitation energy, the transition control unit adds an offset to the energy change, controls the offset so as to be larger at a local minimum, at which the energy is locally minimized, than at a solution at which the energy is not minimized, and resets the offset to zero when the energy change value is larger than a threshold.

5 Claims, 16 Drawing Sheets

| STATE | Q1 | Q2 | Q3 | D1 | D2 | D3 |
|---|---|---|---|---|---|---|
| 0 | 0 | 0 | 0 | 0 | 0 | f |
| 1 | 0 | 0 | 1 | 0 | 1 | 0 |
| 2 | 0 | 1 | 0 | 0 | 1 | 1 |
| 3 | 0 | 1 | 1 | 1 | 0 | 0 |
| 4 | 1 | 0 | 0 | 0 | 0 | 0 |

FIG. 9

OPTIMIZATION APPARATUS AND METHOD OF CONTROLLING THE SAME

CROSS-REFERENCE TO RELATED APPLICATION

This application is based upon and claims the benefit of priority of the prior Japanese Patent Application No. 2017-131719, filed on Jul. 5, 2017, the entire contents of which are incorporated herein by reference.

FIELD

The embodiments discussed herein are related to an optimization apparatus and a method of controlling the optimization apparatus.

BACKGROUND

In the modern society, information processing is performed in most fields. The information processing is performed by using a computing device such as a computer. A variety of data is computed and processed to obtain a meaningful result for performing prediction, determination, control, or the like. Optimization processing is one of the important fields of the information processing. For example, the optimization processing is used for a problem to which a solution is to be found for minimizing resources or cost in a certain process, or for maximizing the effect produced by the process. Such a problem is clearly important.

A typical example of the optimization problem is the linear programming. In the linear programming, a solution is to be found to maximize or minimize an evaluation function under a certain constraint. The evaluation function is expressed with a linear sum of a plurality of continuous variables, and the constraint is also expressed with a linear sum. The linear programming is used in a variety of fields, such as production planning of products. In the linear programming, simplex method and interior point method are known as excellent algorithms, and are able to efficiently solve problems even though the problems have more than hundreds of thousands of variables.

On the other hand, many optimization problems involve variables whose values are not continuous but discrete. Examples of the above-described optimization problems include the traveling salesman problem and the knapsack problem. In the traveling salesman problem, there is found a shortest route to travel a plurality of cities sequentially and return to a start point. In the knapsack problem, when different articles are packed in a knapsack, a combination of articles is determined so that a total price of the combination becomes a maximum price. Such problems are called discrete optimization problems or combinational optimization problems, and known as problems difficult to obtain an optimum solution.

A main reason why the discrete optimization problems are difficult to solve is that each variable takes only a discrete value. As a result, any method that continuously changes a variable so that a current state is improved on an evaluation function and reaches an optimum solution does not work. Moreover, another reason is that, in addition to an original optimum value (optimum solution, global solution, global minimum) of the variable, there are many values (local minimum or local maximum, local solutions) which are local extremal values of the evaluation function. For this reason, an exhaustive method is used to reliably obtain an optimum solution, taking a longer calculation time. In many of the discrete optimization problems, the calculation time for determining an optimum solution is expected to exponentially increase with the size of a problem (that is, the number of variables). Such problems are called non-deterministic polynomial (NP) difficult problems in complexity theory. The above-described traveling salesman problem and the knapsack problem are also included in the NP difficult problems.

As described above, reliably determining an optimum solution of the discrete optimization problems is difficult. However, for dealing with practically important discrete optimization problems, some algorithms have been devised which use intrinsic properties of the problems. In many of the discrete optimization problems, since the calculation time for determining an exact solution is expected to exponentially increase as described above, many of the practical solution methods are approximation algorithms. Thus, in those methods, even though an optimum solution is not obtained, an obtained solution of the evaluation function becomes close to the optimum solution.

On the other hand, there are known other approximation algorithms which do not use the properties of problems to solve the problems. Thus, these algorithms deal with a variety of problems. These algorithms are called metaheuristics, and include simulated annealing (SA), genetic algorithm, and neural network. Even though these metaheuristics may be less efficient than the algorithms that ingeniously use the properties of problems, the metaheuristics are expected to obtain a solution faster than the solution algorithms used to obtain an exact solution.

Hereinafter, the simulated annealing will be described.

The simulated annealing is one type of Monte Carlo method, and uses random numbers to stochastically determine a solution. In the following description, there will be described, as an example, a problem to minimize the value of an evaluation function, which is called energy. If the problem was to maximize the value of an evaluation function, the sign of the evaluation function would be changed.

In an initial state, one of discrete values is put into each variable. Here, a current state is represented by a combination of values of variables. Then another state close to the current state is selected. For example, the other state is a state in which only one of the variables is changed. Then it is determined whether the current state will transition to the other state. Specifically, change in energy for the state transition is calculated, and it is stochastically determined based on the calculated energy change, whether the current state will be changed by accepting the state transition, or kept by rejecting the state transition. Here, if an acceptance probability for energy decrease is larger than that for energy increase, the state will change so as to lower its energy on average. In addition, it is expected that the state will transition to a more desirable state as the time elapses. It is also expected that an approximate solution, which gives energy close to the energy given by an optimum solution or an optimum value, may finally be obtained. However, if the state transition was accepted when the energy is to decrease, and if the state transition was rejected when the energy is to increase, the energy would monotonously decrease in general with time, but would not change any more after reaching a local minimum. Since the discrete optimization problems involve many local minimums as described above, the state is often captured by a local minimum which is not close to an optimum value. For this reason, it is important that the acceptance is stochastically determined.

In the simulated annealing, it has been proved that if the acceptance probability for state transition is determined as follows, the state will reach an optimum solution in a limit where the time (the number of iterations) is infinite.

(1) An acceptance probability p for a state transition having a value of energy change (energy decrease) $-\Delta E$ is determined by using one of the following functions f ( ).

$$p(\Delta E, T) = f(-\Delta E / T) \quad (1\text{-}1)$$

$$f_{metro}(x) = \min(1, e^x) \text{ (Metropolis Method)} \quad (1\text{-}2)$$

$$f_{Gibbs}(x) = \frac{1}{1+e^{-x}} \text{ (Gibbs Method)} \quad (1\text{-}3)$$

Here, T is a parameter called a temperature, and is changed as follows.

(2) As expressed by the following expression, the temperature T is decreased logarithmically with respect to the number t of iterations.

$$T = \frac{T_0 \log(c)}{\log(t+c)} \quad (2)$$

Here, $T_0$ is an initial temperature, and desirably has a sufficiently large value in accordance with a problem to be solved.

When the acceptance probability expressed by the expressions indicated in the above (1) is used, and when the state reaches a stationary state after sufficient iteration, occupation probabilities of states depend on Boltzmann distribution used for expressing a thermal equilibrium state in thermodynamics. In addition, when the temperature is gradually decreased from a high temperature, the occupation probability of a state having a low energy increases. Thus, at a sufficiently low temperature, a low-energy state will be obtained. Since this change is similar to the change obtained when a material is annealed, this method is called simulated annealing. Here, since a state transition which increases energy also occurs stochastically, the state transition corresponds to thermal excitation in physics.

In the simulated annealing, an optimum solution is obtained if the number of iterations is infinite, as described above. In practice, however, since an optimum solution is to be obtained with the finite number of iterations, the optimum solution is not reliably determined. In addition, since the temperature expressed by the expression (2) decreases slowly, the temperature does not decrease sufficiently in a finite time. For this reason, in a practical simulated annealing, the temperature is decreased faster, not logarithmically.

FIG. 13 illustrates a conceptual configuration of an optimization apparatus based on the simulated annealing. Here, although the original simulated annealing generates transition candidates one by one, the following description covers a case where the simulated annealing generates a plurality of transition candidates. This technique can be easily applied to parallel tempering case also.

An optimization apparatus 10 includes a state holding unit 11 which holds a current state S (values of a plurality of state variables). The optimization apparatus also includes an energy calculation unit 12 which calculates energy changes $-\Delta E_i$ of state transitions from the current state S. The state transitions will occur when the values of the plurality of state variables of the current state S are changed. The optimization apparatus 10 also includes a temperature control unit 13 which controls the temperature T, and a transition control unit 14 which controls the state transition.

The transition control unit 14 uses the temperature T, the energy changes $-\Delta E_i$, and random numbers; and stochastically determines which one of the state transitions is accepted, depending on the relative relationship between the energy changes $-\Delta E_i$ and thermal excitation energy.

The transition control unit 14 includes a candidate generation unit 14a and a transition assessor 14b. The candidate generation unit 14a generates candidates of state transition. The transition assessor 14b stochastically determines whether the candidates of state transition are accepted or not, by using the energy changes $-\Delta E_i$ of the candidates and the temperature T. The transition control unit 14 also includes a transition determination unit 14c and a random-number generation unit 14d. The transition determination unit 14c determines a candidate to be used, from the accepted candidates. The random-number generation unit 14d generates probability values.

The operation in one iteration is performed as follows. The candidate generation unit 14a generates one or more candidates of state transition (candidate numbers: Ni) from the current state S stored in the state holding unit 11, to next states. The energy calculation unit 12 uses the current state S and the state transition candidates, and calculates energy changes $-\Delta E_i$ for the state transitions of the candidates. The transition assessor 14b uses the temperature T generated by the temperature control unit 13 and probability values (random numbers) generated by the random-number generation unit 14d; and accepts state transitions with acceptance probabilities expressed by the expressions described in the above (1), depending on the energy changes $-\Delta E_i$ for the state transitions. The transition assessor 14b then outputs transition acceptances $f_i$, which indicate whether each state transition is accepted or not (hereinafter, whether each state transition is accepted or not may be referred to also as acceptance or rejection on state transition). When a plurality of state transitions is accepted, the transition determination unit 14c randomly selects one of the plurality of state transitions, by using a random number. The transition determination unit 14c then outputs a transition number N of the selected state transition, and a transition acceptance f. When the one state transition is selected, the values of the state variables stored in the state holding unit 11 are updated in accordance with the selected state transition.

The optimization apparatus 10 starts its operation from the initial state, repeats the above-described iteration processes while causing the temperature control unit 13 to lower the temperature, and ends its operation when an end determination condition is satisfied. In the end determination condition, it may be determined whether the predetermined number of iterations is reached, or whether the energy becomes lower than a predetermined value. The optimization apparatus 10 outputs a state obtained when the optimization apparatus 10 ends its operation. In practice, however, since the temperature does not become zero when the finite number of iterations is reached, the occupation probabilities of state depend on Boltzmann distribution even when the optimization apparatus 10 ends its operation. Thus, a solution obtained when the optimization apparatus 10 ends its operation is not necessarily an optimum value or a good solution. For this reason, in a practical method, a state which minimizes the energy at a point in the iteration processes is stored, and outputted at the end of the operation.

FIG. 14 is a block diagram, including a circuit diagram, of the transition control unit based on a typical simulated annealing which generates candidates one by one, that is, a block diagram of a configuration of computation units used for the transition assessor.

The transition control unit 14 includes a random-number generation circuit 14b1, a selector 14b2, a noise table 14b3, a multiplier 14b4, and a comparator 14b5.

The selector 14b2 selects one of the energy changes $-\Delta E_i$, calculated for state transition candidates, in accordance with the transition number N which is a random number generated by the random-number generation circuit 14b1; and outputs the selected energy change.

The function of the noise table 14b3 will be described later. The noise table 14b3 may be created in a memory, such as a random access memory (RAM) or a flash memory.

The multiplier 14b4 multiplies a value outputted from the noise table 14b3, with the temperature T; and outputs the product (which corresponds to the above-described thermal excitation energy) of the value and the temperature.

The comparator 14b5 compares the multiplication result outputted by the multiplier 14b4, with the energy change $-\Delta E$ selected by the selector 14b2; and outputs a comparison result, as the transition acceptance f.

The transition control unit 14 illustrated in FIG. 14 basically includes the above-described functions, and thus the mechanism to accept a state transition with the acceptance probability, expressed by the expressions of the above (1), will be described.

A circuit which outputs 1 when receiving the acceptance probability p, and outputs 0 when receiving 1-p may be a comparator. The comparator has two input terminals a and b. The comparator outputs 1 when a signal at the input terminal a is larger than a signal at the input terminal b, and outputs 0 when a signal at the input terminal a is smaller than a signal at the input terminal b. Here, the input terminal a receives the acceptance probability p, and the input terminal b receives a uniform random number obtained in an interval of [0,1). Thus, if the acceptance probability p, calculated by using the expressions of the above (1) and depending on the energy change and the temperature T, is received by the input terminal a of the comparator, the above-described function is achieved.

That is, where a symbol f represents the function used by the expressions of the above (1) and a symbol u represents a uniform random number obtained in the interval of [0,1), the above-described function is achieved by a circuit which outputs 1 when $f(-\Delta E/T)$ is larger than u.

Alternatively, the same function may be achieved by the following modification. Here, when an identical monotone increasing function is applied to two numbers, the magnitude relationship between the two numbers does not change. Thus, when an identical monotone increasing function is applied to signals at the two input terminals of the comparator, the comparator outputs an identical signal. So, if the inverse function $f^{-1}$ of the function f is used as the monotone increasing function, the comparator outputs 1 when $-\Delta E/T$ is larger than $f^{-1}(u)$. Furthermore, since the temperature T is a positive value, the comparator outputs 1 when $-\Delta E$ is larger than $Tf^{-1}(u)$. The noise table 14b3 of FIG. 14 is a conversion table to produce the inverse function $f^{-1}(u)$. The conversion table receives a discrete input value obtained in the interval of [0,1), and outputs a value of one of the following functions.

$$f_{metro}^{-1}(u) = \log(u) \tag{3-1}$$

$$f_{Gibbs}^{-1}(u) = \log\left(\frac{u}{1-u}\right) \tag{3-2}$$

The transition control unit 14 also includes a latch circuit to latch a determination result, and a state machine to generate a timing signal used for the latch circuit; but these components are omitted in FIG. 14 for simplification.

FIG. 15 illustrates a flow of operations of the conventional transition control unit. In the operation flow, one state transition is selected as a candidate (S1); an energy change for the state transition is compared with a product of the temperature and a random number, and thereby the acceptance or rejection on state transition is determined (S2); and the state transition is used if the state transition is accepted, and not used if the state transition is rejected (S3).

As can be seen in the above description, although the simulated annealing is used for general purpose, it has a drawback of taking a long calculation time because the temperature is gradually decreased. In addition, the simulated annealing has another drawback in which decreasing the temperature is difficult to adjust in accordance with a problem to be solved. The latter drawback will be described below with reference to FIG. 16.

In a path of state transition from an initial value to an optimum solution or an approximate solution, there are many local minimums having not good degrees of approximation. To quickly escape from these local minimums, a high temperature will be used to cause a sufficient thermal excitation. At the high temperature, however, since the energy is widely distributed in Boltzmann distribution, there is only a small difference in occupation probability between an optimum solution or an approximate solution at which the energy becomes lower (hereinafter, referred to as a good solution), and a local minimum which has a bad degree of approximation (hereinafter, referred to as a bad solution), and at which the energy becomes higher. As a result, even though one solution quickly escapes from a local minimum, the solution will merely reach one of many bad solutions, thus having less probability to reach a good solution. To increase the occupation probability of a good solution, a low temperature will be used to decrease the thermal excitation energy with respect to an energy difference in occupation probability between a good solution and a bad solution. In this case, however, the decreased thermal excitation energy disadvantageously decreases the possibility to cross a peak of energy in a path, causing almost no change in the state. As countermeasures, an intermediate temperature would be used to cross the peak of energy and slightly increase the difference between the good solution and the bad solution. The intermediate temperature would be changed gradually to gradually increase the occupation probability of the good solution. If the temperature is decreased too slowly, the temperature is not sufficiently decreased in a finite time, and thus fails to increase the occupation probability of the good solution. In contrast, if the temperature is decreased rapidly, the temperature is significantly decreased before the current solution escapes from the local minimum, and thus leaves the solution captured by the bad solution. For this reason, as the temperature is decreased, the original simulated annealing would decrease the rate of change in the temperature, and wait at each temperature until the distribution of energy at each temperature becomes close to Boltzmann distribution.

Thus, in the original simulated annealing, it is desirable that the temperature be slowly decreased, and the decreasing of the temperature be appropriately adjusted in accordance with a problem to be solved, to escape a current solution from a local minimum by using only the thermal excitation caused by the temperature.

Here, one conventional method randomly causes a state transition to escape a current solution from a local minimum.

See, for example, Japanese Laid-open Patent Publication No. 2016-66378.

As described above, when an optimization problem is solved by using the simulated annealing, the calculation time becomes longer because the escape from a local minimum takes a long time. In addition, there are many bad local minimums, as also described above. Thus, even though a state having a local minimum randomly transitions to another state, the state will be captured by one of near bad local minimums again, which fails to shorten the calculation time.

SUMMARY

According to one aspect, there in provided an optimization apparatus including: a state holding unit configured to hold values of a plurality of state variables included in an evaluation function that expresses energy; an energy calculation unit configured to calculate an energy change of the energy for each of a plurality of state transitions that is caused by change in any of the plurality of state variables; a temperature control unit configure to control a temperature; and a transition control unit configured to add an offset to the energy change, when stochastically determining based on the temperature, the energy change, and a random number whether to accept one of the plurality of state transitions depending on a relative relationship between the energy change and thermal excitation energy, control the offset so as to be larger at a local minimum, at which the energy is locally minimized, than at a solution at which the energy is not minimized, and reset the offset to zero when the energy change is larger than a first threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates one example of a truth table of a logic circuit for generating the pulse signals;

DESCRIPTION OF EMBODIMENTS

Hereinafter, some embodiments will be described with reference to the accompanying drawings.

First Embodiment

Figure 1:
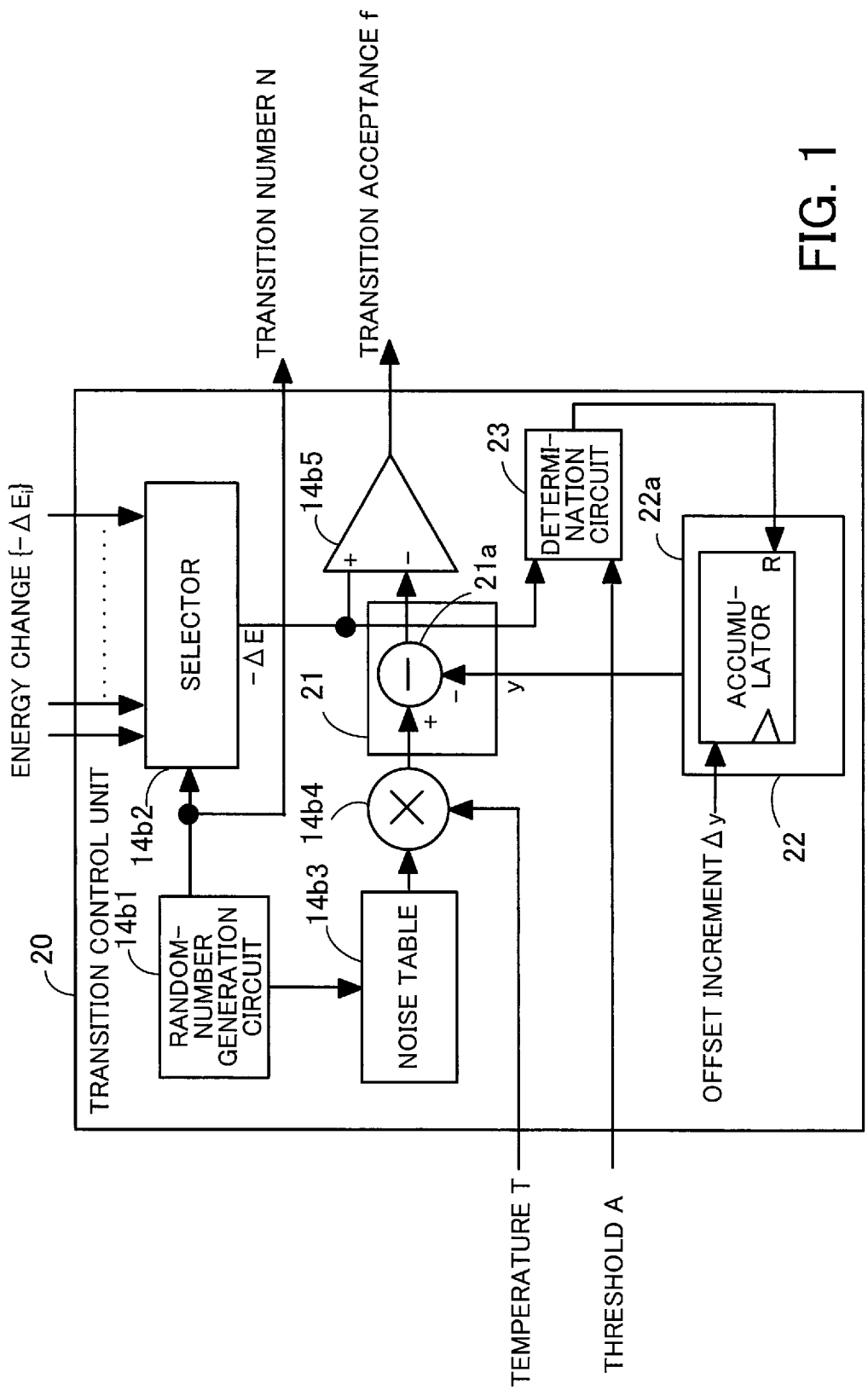
FIG. 1 illustrates one example of a transition control unit of an optimization apparatus of a first embodiment.
Figure 14:
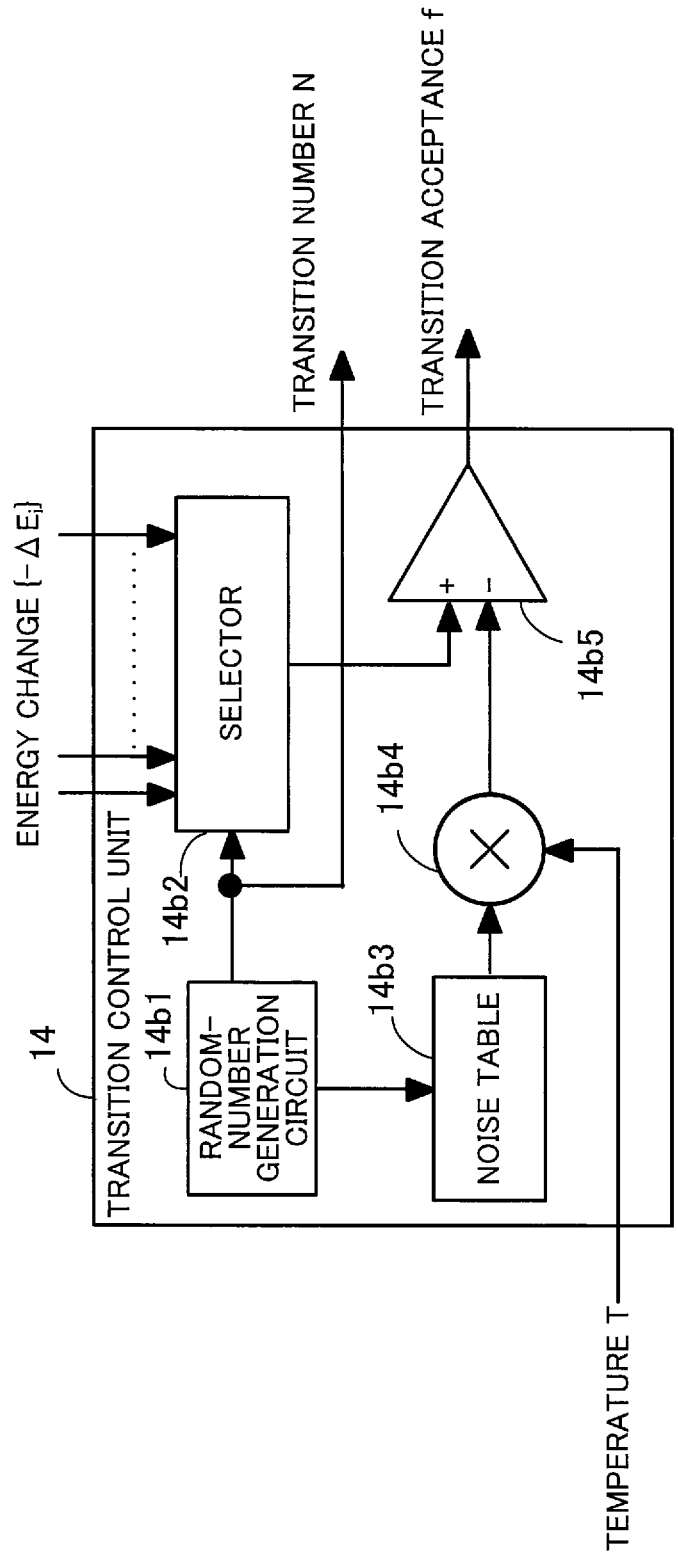
FIG. 14 is a block diagram, including a circuit diagram, of a conventional transition control unit, that is, a block diagram of a configuration of computation units used for a transition assessor.
Figure 15:
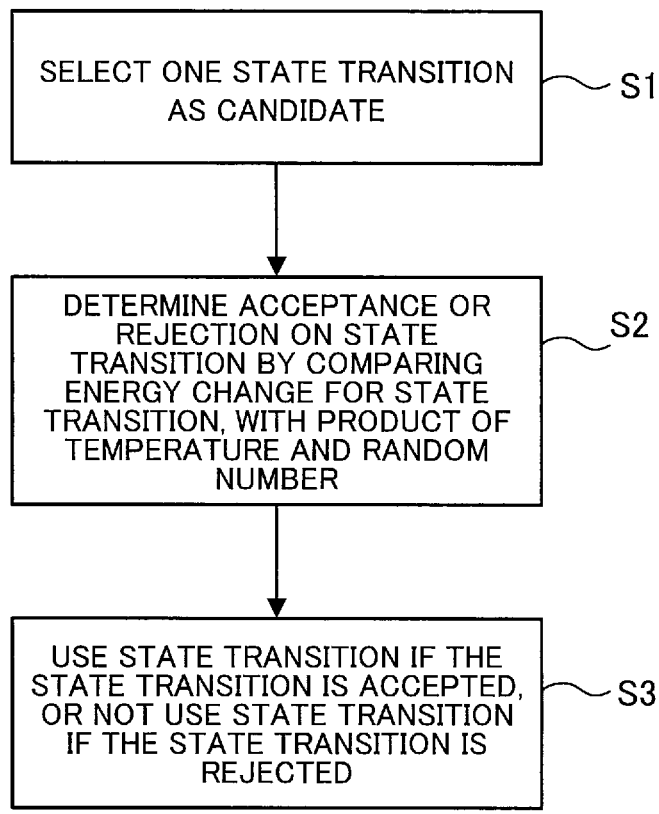
FIG. 15 illustrates a flow of operations of the conventional transition control unit.
Figure 16:
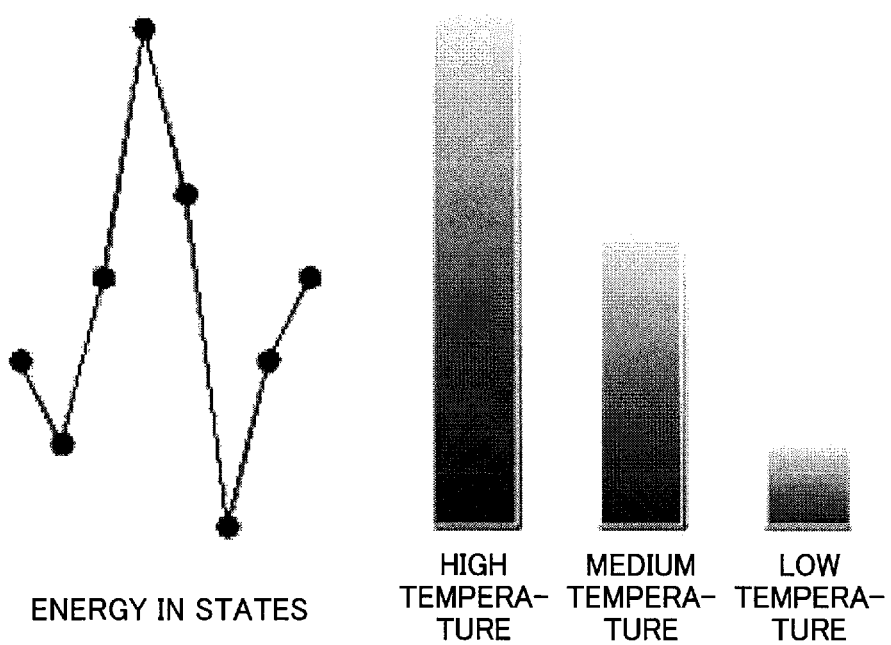
FIG. 16 illustrates a concept of occupation probabilities in states determined by using a pseudorandom number method.

FIG. 1 illustrates one example of a transition control unit of an optimization apparatus of a first embodiment. The same components as those of the transition control unit 14 illustrated in FIG. 14 are given the same reference symbols.

Figure 13:
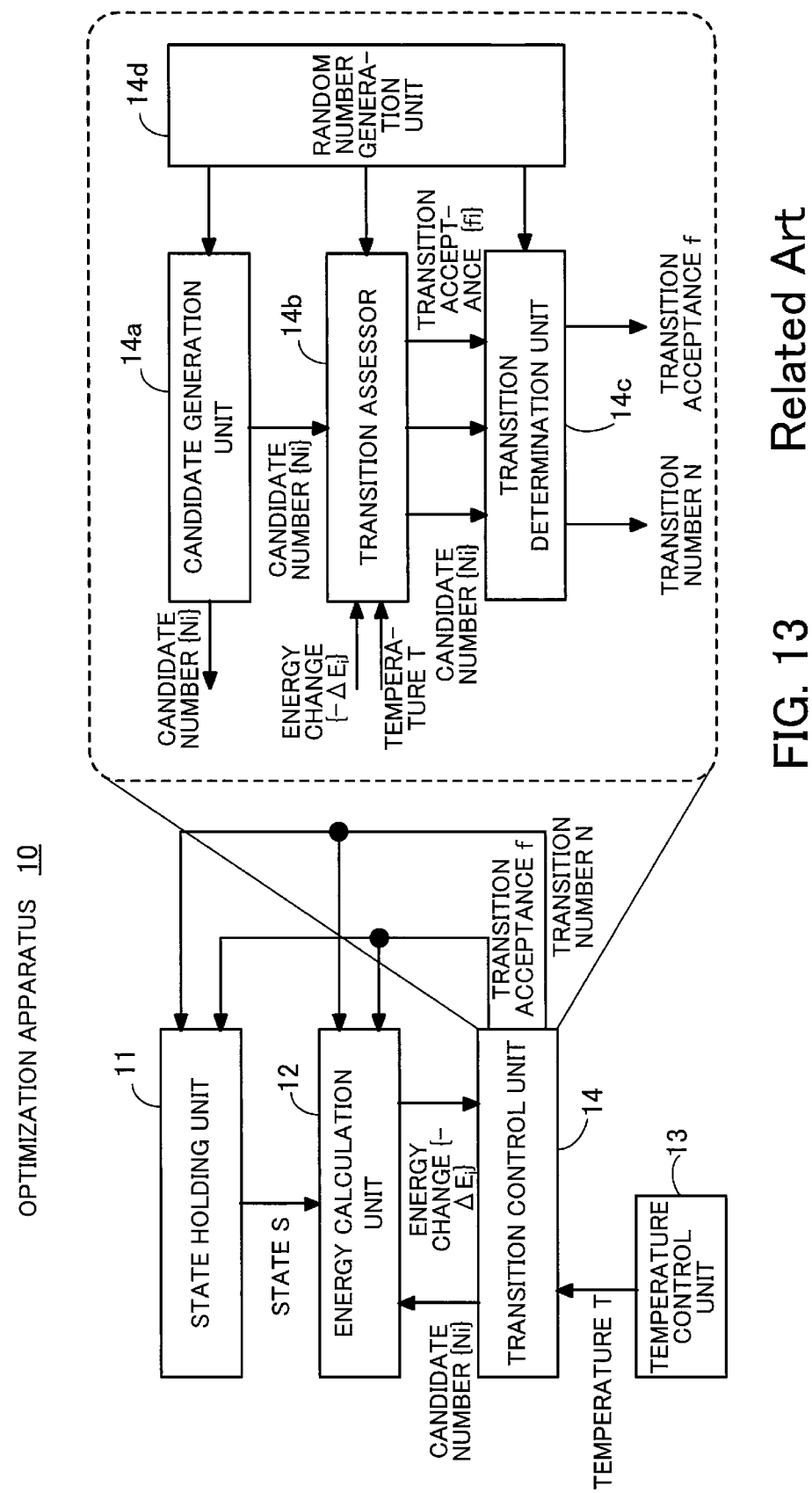
FIG. 13 illustrates a conceptual configuration of an optimization apparatus based on simulated annealing.

As illustrated in FIG. 1, a transition control unit 20 includes an offset adding circuit 21, an offset control circuit 22, and a determination circuit 23, which have been added to the circuit that achieves the function of the transition assessor 14b illustrated in FIG. 13. The other components of the transition control unit 20 are the same as the components of the transition control unit 14 illustrated in FIG. 14.

The offset adding circuit 21 adds an offset y to an energy change $-\Delta E$ of a state transition. In FIG. 1, the offset adding circuit 21 is a subtractor 21a. Thus, FIG. 1 illustrates a configuration in which the offset y is subtracted from a product $Tf^{-1}(u)$ (which corresponds to the thermal excitation energy, and is to be compared with the energy change $-\Delta E$) of a temperature T and a random number. Instead, the offset y may be added to the energy change $-\Delta E$.

The offset control circuit 22 controls the offset y so that the offset y for a local minimum (at which the energy has a local minimum value) becomes larger than the offset y for other solutions other than the local minimum. In FIG. 1, the offset control circuit 22 is an accumulator 22a having a reset terminal R. When the signal outputted from the determination circuit 23 to the reset terminal R indicates that the energy change $-\Delta E$ is larger than the predetermined threshold A, the accumulator 22a resets the offset y to zero. The accumulator 22a also has an input terminal and a clock terminal. When the signal outputted from the determination circuit 23 indicates that the energy change $-\Delta E$ is equal to or smaller than the predetermined threshold A, the accumulator 22a increments the offset y by an offset increment $\Delta y$ inputted to the input terminal, every time the clock terminal receives a pulse signal (not illustrated).

The pulse signal (not illustrated) is supplied from a later-described state machine, for example. The offset increment $\Delta y$ is stored in a resistor (not illustrated), for example.

The determination circuit 23 outputs a determination result indicating whether the energy change $-\Delta E$ is larger than the predetermined threshold A. Alternatively, the determination circuit 23 may output a determination result indicating whether the absolute value of the energy change $-\Delta E$ is larger than a predetermined threshold A.

Figure 2:
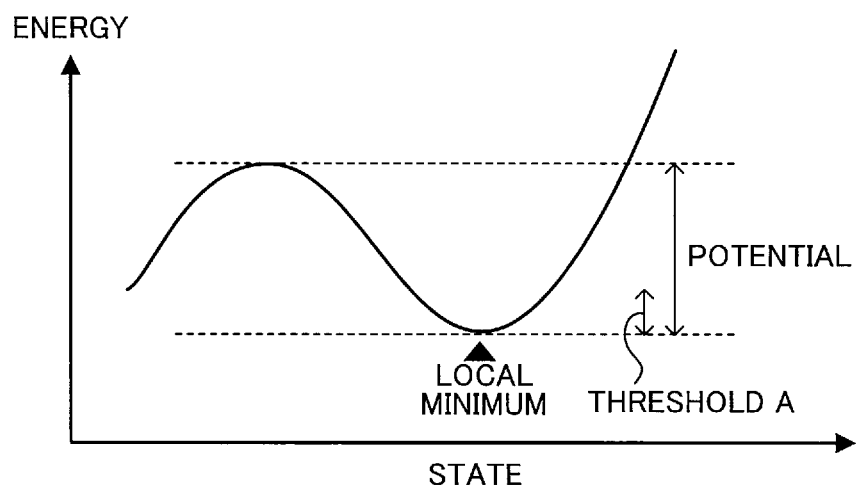
FIG. 2 illustrates one example of a threshold A.

FIG. 2 illustrates one example of the threshold A. The vertical axis represents the energy, and the horizontal axis represents the state (that is, combination of values of state variables).

If the threshold A is too large, the convergence may be impaired. Thus, the threshold A is set to, for example, about one severalth of a predetermined energy difference (a potential illustrated in FIG. 2) with which the state escapes from a local minimum. When there is solved a maximum cut problem in which the energy difference is +1, 0, or −1, the threshold A may be 0. The threshold A is stored in a resistor (not illustrated), for example. The threshold A may be changed as appropriate.

The above-described transition control unit 20 accepts a state transition, when $-\Delta E+y$ is larger than $Tf^{-1}(u)$. Here, the value of $-\Delta E+y$ is a sum obtained by adding the offset y, which is held by the accumulator 22a, to the energy change $-\Delta E$ selected by the selector 14b2; and the value of $Tf^{-1}(u)$ is a product of the temperature T and a random number. In the following description, when a transition acceptance f outputted from the comparator 14b5 is 1, the transition acceptance f indicates that the state transition is accepted; when the transition acceptance f is 0, the transition acceptance f indicates that the state transition is rejected.

The accumulator 22a changes the offset y as follows, depending on the determination result outputted from the determination circuit 23. That is, when the energy change $-\Delta E$ is larger than the threshold A, the accumulator 22a resets the offset y to zero. On the other hand, when the energy change $-\Delta E$ is equal to or smaller than the threshold A, the accumulator 22a increments the offset y by the offset increment $\Delta y$.

Figure 3:
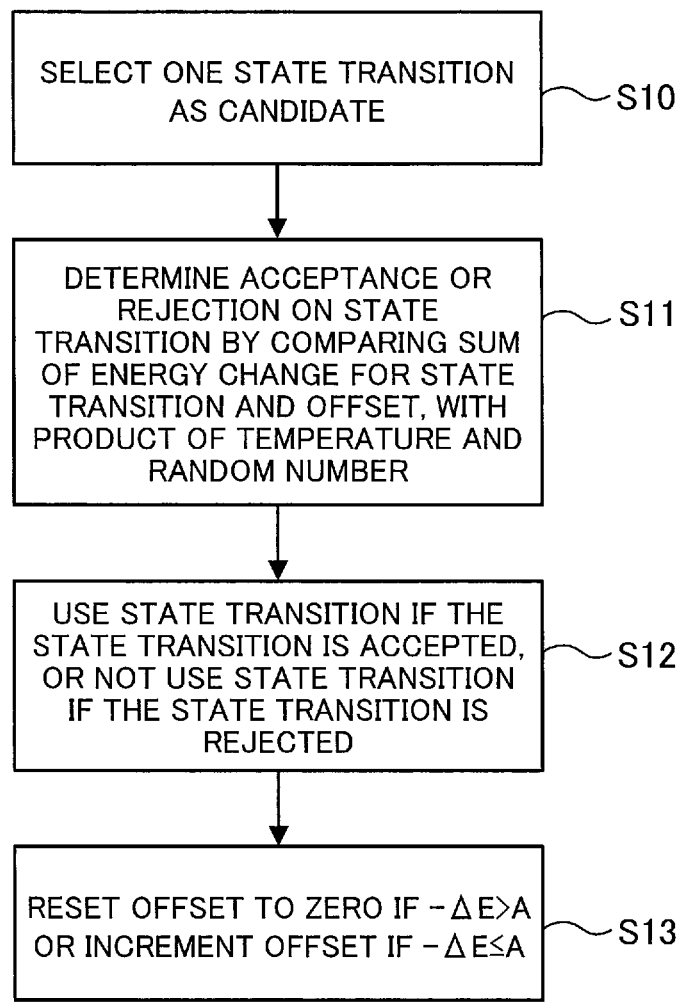
FIG. 3 illustrates a flow of operations of the transition control unit of the optimization apparatus of the first embodiment.

FIG. 3 is a flow of operations to determine the acceptance or rejection on state transition.

In the operation flow, one state transition is selected as a candidate (S10); and the acceptance or rejection on state transition is determined by comparing a sum of the energy change $-\Delta E$ for the one state transition and the offset y, with the product of the temperature T and a random number (S11). In addition, if the one state transition is accepted, the one state transition is used; if the one state transition is rejected, the one state transition is not used (S12). Furthermore, if $-\Delta E>A$, the offset y is reset to zero; if $-\Delta E \leq A$, the offset y is incremented (S13).

The other operations may be the same as those of the typical simulated annealing.

In the following description, before describing the effect produced by the transition control unit 20, which includes the offset adding circuit 21, the offset control circuit 22, and the determination circuit 23, another transition control unit which does not include the determination circuit 23 will be described as a comparative example.

COMPARATIVE EXAMPLE

Figure 4:
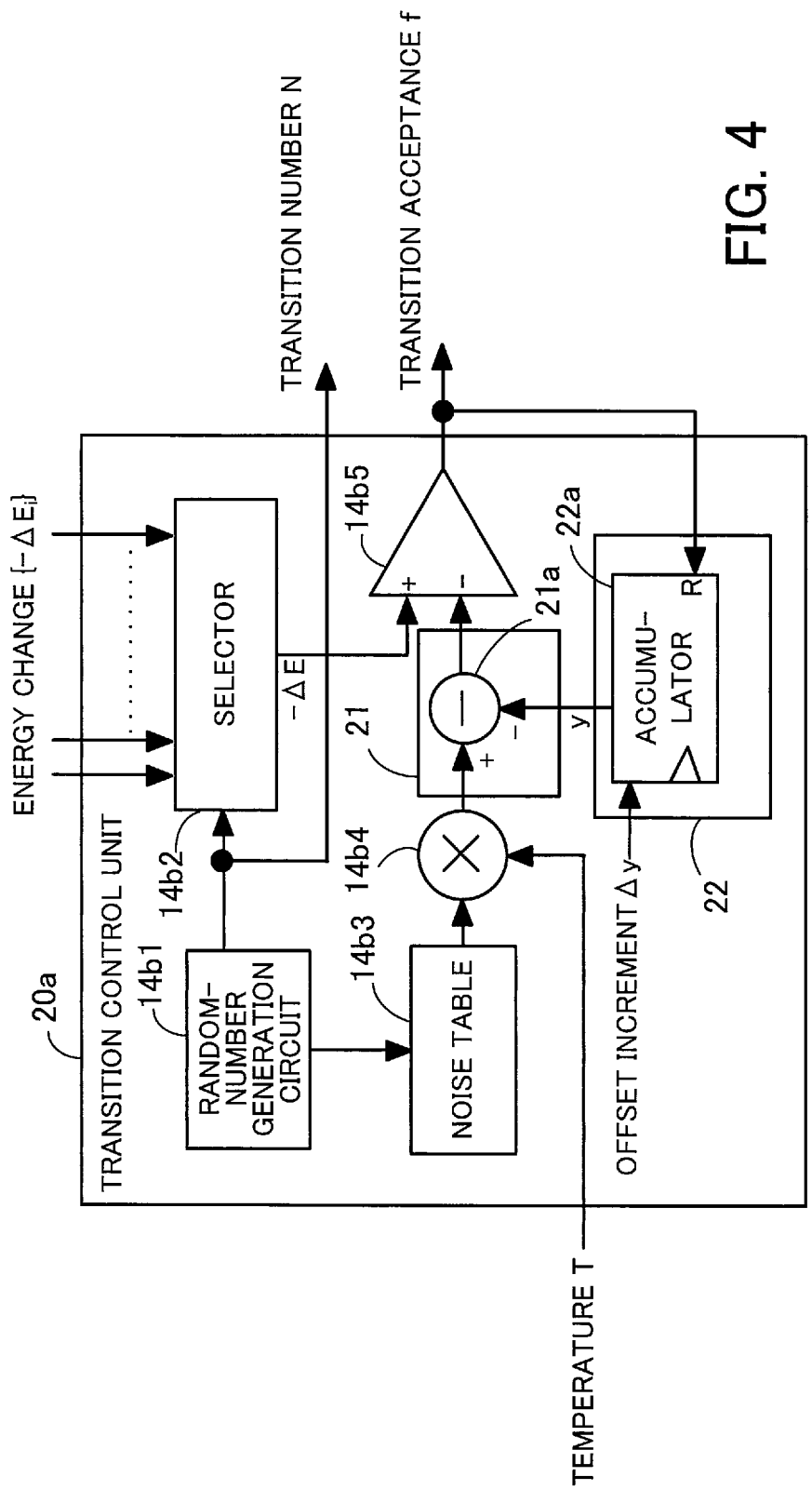
FIG. 4 illustrates a transition control unit having no determination circuit.

FIG. 4 illustrates a transition control unit which does not include the determination circuit.

A transition control unit 20a does not include the determination circuit 23 illustrated in FIG. 1, and the transition acceptance f outputted by the comparator 14b5 is received by the reset terminal R of the accumulator 22a. If the transition acceptance f is 1, the offset y is reset to zero.

The transition control unit 20a, which includes the offset adding circuit 21 and the offset control circuit 22, produces the following effect.

When a current state is captured by a local minimum and not able to escape from the local minimum, the energy changes for the current state to transition to the other states take positive large values. The acceptance probabilities for the transitions from the current state to the other states are expressed by the exponential function as expressed by the following expressions (4-1) and (4-2), regardless of which of Metropolis method and Gibbs method is used.

$$f_{metro}(x) \approx e^x (x \ll -1) \qquad (4\text{-}1)$$

$$p(\Delta E, T) \approx e^{-\Delta E/T} (\Delta E \gg T) \qquad (4\text{-}2)$$

In the determination of the acceptance or rejection on all state transitions, when the determination is performed by using values in which the offset y has been added to the energy changes $-\Delta E_i$, the acceptance probabilities for all state transitions are expressed by the following expression (5). The expression (5) indicates that the acceptance probabilities for all state transitions are increased by a common scaling factor of $e^{y/t}$.

$$\tilde{p}(\Delta E_i, T) = p(\Delta E_i - y, T) \approx e^{(-\Delta E_i + y)/T} = e^{y/T} p(\Delta E_i, T) \qquad (5)$$

In the convergence theorem of simulated annealing, the state will transition toward a desired state if the acceptance or rejection on state transition is determined based on the state transition probability obtained by using Metropolis method or Gibbs method. Since the state transition probability at a local minimum is small, the selection for a transition candidate is repeated many times. The branch ratio of the state transition performed after the repetition is proportional to a transition probability obtained by using Metropolis method or Gibbs method. Thus, if absolute values of acceptance probabilities for state transitions are increased while relative ratios of the acceptance probabilities are kept, the branch ratio for the state transition is also kept. As a result, the stay time at a local minimum is shortened without adversely affecting the convergence. Therefore, the calculation time is shortened. For this reason, the offset y is used to facilitate the escape from a local minimum. However, if the offset y is not appropriately controlled, the acceleration effect may become insufficient, or the convergence may deteriorate.

When the current state does not stay at any local minimum, the transition probability is not able to be approximated by using the exponential function because there is a state transition which decreases the energy. Thus, if the offset y is used, the offset y disadvantageously changes the branch ratio. For this reason, at solutions other than the local minimums, the offset y is desirably set to zero or a sufficiently small value.

In addition, if the offset y is constant when the current state stays at a local minimum, the acceleration effect is not sufficient although produced. In a case where most of the state transitions involve large increase in energy, the transition probabilities remain small although the offset y is given. Thus, when the state does not escape from a local minimum even though the offset y is given, a larger offset y would be desirably used.

In this case, the offset control circuit 22 gradually increases the offset y when no state transition occurs, and resets the offset y to zero when a state transition occurs.

In a case where the relationship between the energy and the state is as illustrated in FIG. 2, while the state stays at a local minimum, the offset y is gradually increased, so that the state eventually escapes from the local minimum. In addition, when the state does not stay at any local minimum, the offset y is zero or has a small value because state transitions frequently cause the reset. Thus, the branch ratio is not significantly affected by the offset y.

In this manner, the offset y is controlled so as to be larger at a local minimum than the offset y at other solutions at which the energy does not have a local minimum value. As a result, the adverse effect to the convergence is reduced, and the calculation time is shortened, compared to the method which merely causes the state at a local minimum to randomly transition to another state.

In addition, it is desirable that the offset increment Δy be appropriately selected. As the offset increment Δy is increased, the state is able to escape earlier from a local minimum. However, if the offset increment Δy is significantly increased, the branch ratio may be affected by the offset y because the state does not necessarily transition also at a solution other than a local minimum. Also at the local minimum, if the offset y is increased to a large value before there is provided a state transition candidate having less energy increase and a high acceptance probability, the branch ratio may be shifted from a correct value. To prevent the branch ratio from being significantly affected, an average stay time at a local minimum is desirably about several times an average stay time at a solution other than the local minimum.

Thus, an appropriately-selected offset increment Δy allows the stay time at a local minimum to be shortened, without adversely affecting the convergence, thus shortening the calculation time for optimization.

However, in an optimization problem (for example, a maximum cut problem) in which a bottom of local minimums is flat, a state transition having no energy change occurs with high probability.

Figure 5:
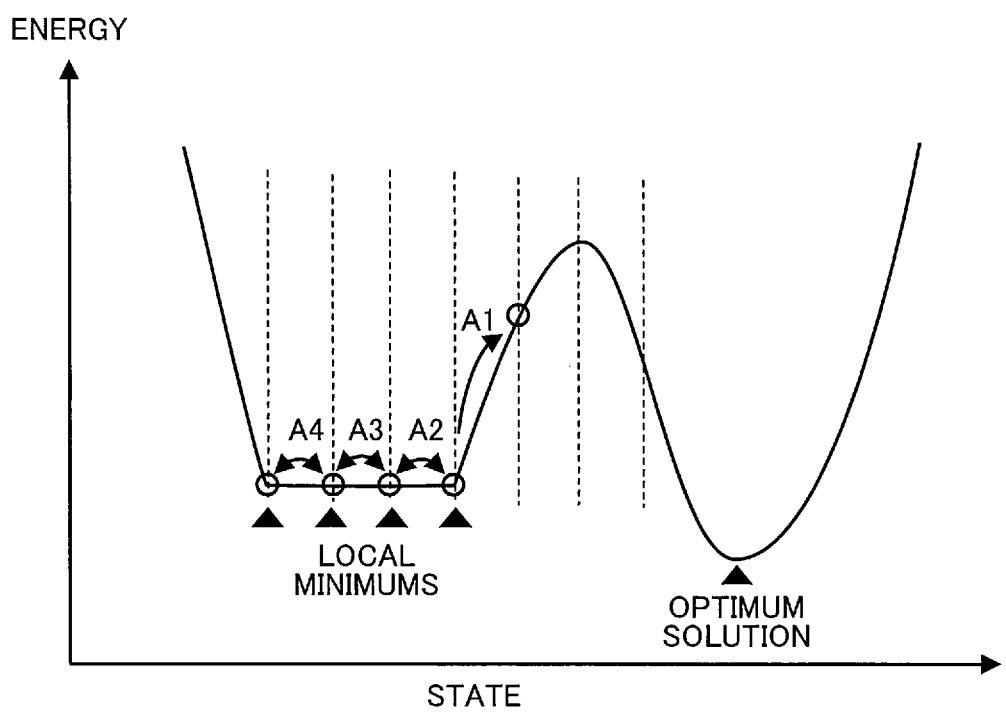
FIG. 5 illustrates one example of state transitions having no energy change.

FIG. 5 illustrates one example of state transitions having no energy change. The vertical axis represents the energy, and the horizontal axis represents the state.

In an optimization problem having the relationship between the energy and the state as illustrated in FIG. 5, a bottom of local minimums is flat. Thus, in addition to a state transition (indicated by an arrow A1 having energy change, other state transitions (indicated by arrows A2, A3, and A4) having no energy change may occur in the bottom of the local minimums. In the transition control unit 20a of the comparative example, since the offset y is reset to zero when a state transition occurs, the escape facilitating function, which facilitates the state to escape from a local minimum, may fail to work.

In contrast, in the transition control unit 20 of FIG. 1, since the offset y is not reset to zero when the energy change −ΔE is equal to or smaller than the predetermined threshold A, the offset y is increased when the above-described state transition having no energy change occurs. Thus, even when the local minimums as illustrated in FIG. 5 exist, the escape facilitating function, which uses the offset and allows the state to escape from a local minimum, functions.

Figure 6:
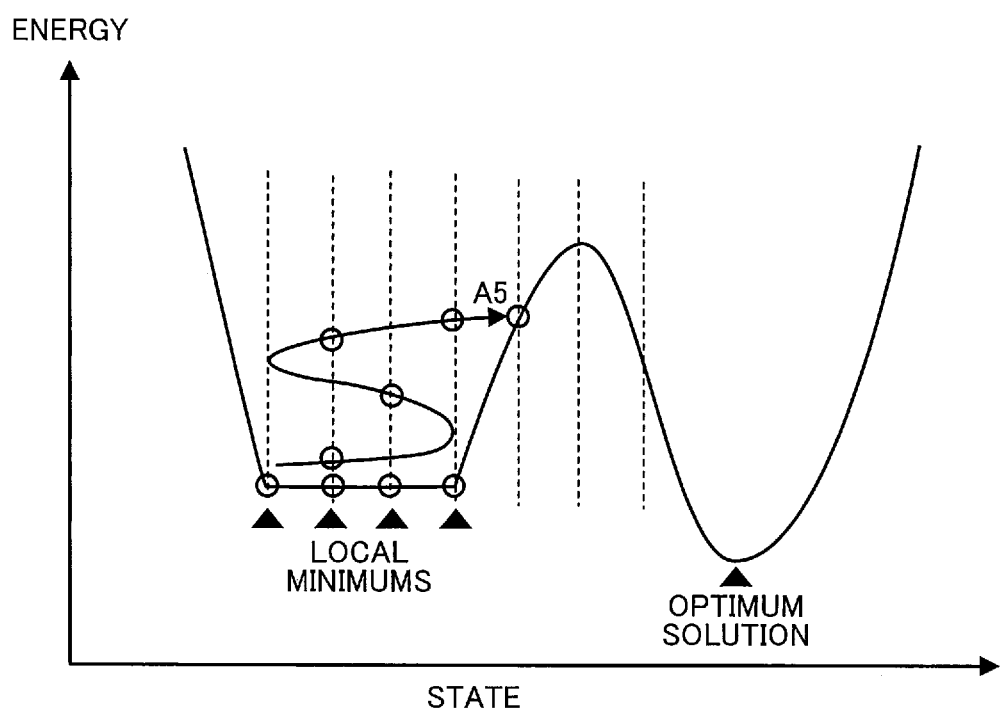
FIG. 6 illustrates one example of state transitions which occur in a case where the transition control unit of the first embodiment is used.

FIG. 6 illustrates one example of state transitions which occur in a case where the transition control unit of the first embodiment is used. The vertical axis represents the energy, and the horizontal axis represents the state.

As in FIG. 5, a bottom of local minimums is flat. However, when the state transition in which the energy change −ΔE is zero occurs, the transition control unit 20 increases the offset y. As a result, the acceptance probability for state transition is increased, and the stay time at the local minimums is shortened. For example, as illustrated by an arrow A5, the transition control unit 20 produces a state transition which increases effective energy of each state, accelerates (facilitates) the escape from the local minimums, and shortens the calculation time of an optimization problem to be solved, compared to the transition control unit 20a of the comparative example.

As described above, in the optimization apparatus of the present embodiment, the new components illustrated in FIG. 1 have been added to the transition control unit 14 of FIG. 14, which achieves the simulated annealing. With this configuration, the calculation time will be shortened. The other components other than the new components have not been changed. Thus, the optimization apparatus having the above-described transition control unit 20 is applicable, without depending on a group of state transitions acceptable to a current state, functions which give energy changes caused by the state transitions, and computation methods for the functions. For this reason, specific circuit configurations of the other components will not be described in detail.

Here, there will be briefly described a computation method for energy change, which is caused by generating a transition candidate and causing a state transition. This computation method is applied in the simulated annealing performed in a case where the energy to be optimized is expressed by using Ising model or Boltzmann machine, which is substantially equivalent to Ising model.

Ising model expresses a system having N number of spins, each of which acts with each other. Each spin $s_i$ takes a binary value of ±1. The energy of the system is expressed by the following expression (6).

$$E = \frac{1}{2} \sum_{i,j} J_{i,j} s_i s_j + \sum_i h_i s_i \qquad (6)$$

In the expression (6), $J_{i,j}$ represents an interaction coefficient between spins $s_i$ and $s_j$, and $h_i$ represents an external magnetic field coefficient which is a bias field of the spin.

Since one state-transition candidate from a current state to another state corresponds to a flip of one spin, there are N number of flips of spins. Thus, when one or more state-transition candidates are selected, a group of one or more spin numbers of spins, which flip, is produced.

An energy change caused by an i-th spin flip is expressed by the following equation (7).

$$\Delta E_i = -2s_i \frac{\partial E}{\partial s_i} = -2s_i \left( \sum_j J_{i,j} s_j + h_i \right) \qquad (7)$$

Here, $F_i$ of the following expression (8) is called a local field, and represents a rate of the energy change caused by the inversion of each spin.

$$F_i = \sum_j J_{i,j} s_j + h_i \qquad (8)$$

Whether one state transition is accepted or not is determined depending on the energy change. Thus, the energy change may be calculated by using the local field, without calculating the energy itself. In a case where a state which is obtained as output and which level is determined with respect to the minimum energy is used, the energy corresponding to the state may be determined by calculating an energy change by using the local field, and by accumulating the energy change on the minimum energy.

In addition, the following expression (9) is given.

$$\frac{\partial}{\partial s_j} F_i = J_{i,j} \qquad (9)$$

Thus, the local field does not have to be recalculated every time by using matrix operation. That is, only an energy change produced by a spin flip caused by a state transition has only to be added. Thus, the state holding unit 11 illustrated in FIG. 13 may be achieved by using relatively simple operation circuits, such as an N-bit resistor storing N number of spin values, an adder, and an exclusive-OR (XOR) circuit.

The simulated annealing based on Boltzmann machine, which is used for neural network, is the same as the simulated annealing based on Ising model, except that state variables in Boltzmann machine take a binary value of (0,1). Thus, the simulated annealing based on Boltzmann machine is almost the same as the simulated annealing based on Ising model. The energy, the energy change, and the local field are expressed by the following expressions (10), (11), and (12).

$$E = \frac{1}{2}\sum_{i,j} J_{i,j}s_i s_j + \sum_i h_i s_i \qquad (10)$$

$$\Delta E_i = (1 - 2s_i)\frac{\partial E}{\partial s_i} = (1 - 2s_i)\left(\sum_j J_{i,j}s_j + h_i\right) \qquad (11)$$

$$F_i = \sum_j J_{i,j}s_j + h_i \qquad (12)$$

In Boltzmann machine, the spins in Ising model are often called neurons. In the following description, however, the neurons are called spins for simplification.

As described above, the simulated annealing based on Ising model is almost the same as the simulated annealing based on Boltzmann machine, and both annealings are able to be converted to each other. Thus, the following description will be made for the simulated annealing based on Boltzmann machine, in which a state variable is easily associated with (0,1) of a logic circuit.

In Boltzmann machine (and the simulated annealing based on Ising model), only one state variable changes with a state transition, and an energy change for the change of the state variable may be calculated in advance by using the local field. Thus, in the following embodiments, a precalculated energy change is selected in accordance with a transition candidate. However, in a case where Boltzmann machine is not used, since one transition may change a plurality of state variables, the energy change may be calculated after a transition candidate occurs.

Second Embodiment

Figure 7:
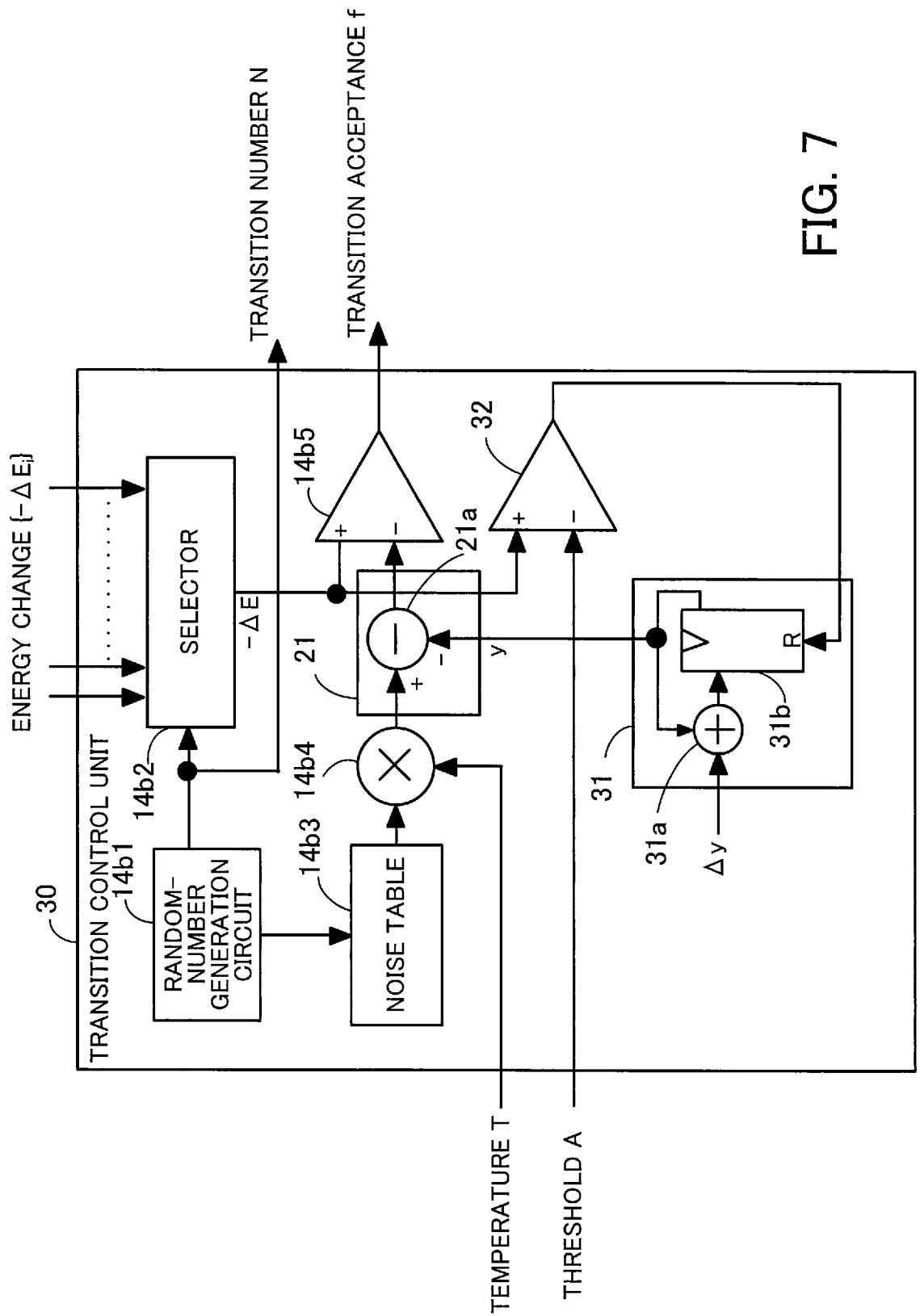
FIG. 7 illustrates one example of a circuit configuration of a transition control unit of an optimization apparatus of a second embodiment.

FIG. 7 illustrates one example of a circuit configuration of a transition control unit of an optimization apparatus of a second embodiment. The same components as those of the transition control unit 20 illustrated in FIG. 1 are given the same reference symbols. A transition control unit 30 of FIG. 7 is basically the same as the transition control unit 20 of FIG. 1, but an accumulator 31 is illustrated in a circuit diagram. In addition, a comparator 32 is illustrated as one example of the determination circuit. The comparator 32 outputs 1 when the energy change $-\Delta E$ is larger than the threshold A, and outputs 0 when the energy change $-\Delta E$ is equal to or smaller than the threshold A.

The accumulator 31 includes an adder 31a, and a resistor 31b having a clock terminal and a reset terminal R.

The adder 31a outputs a sum of the offset increment $\Delta y$ and the offset y outputted by the resistor 31b.

When the output value from the comparator 32 to the reset terminal R is 0, the resistor 31b receives the output value from the adder 31a in synchronization with a pulse signal applied to the clock terminal, and outputs the output value as the offset y. When the output value from the comparator 32 to the reset terminal R is 1, the resistor 31b resets a holding value to zero, and outputs zero.

The bit width of the adder 31a and the resistor 31b is appropriately set. The bit width may be substantially the same as that of the energy change $-\Delta E$. For example, if the bit width of the interaction coefficient is 16, and the number of spins is 1024, the maximum bit width of the energy change $-\Delta E$ is 27. Thus, the bit width of 27 is sufficient for the energy change $-\Delta E$. In practice, the bit width of the energy change $-\Delta E$ may be smaller than 27. The bit width of the output from the noise table 14b3 may be substantially equal to or smaller than that of the energy change $-\Delta E$.

The pulse signal supplied to the clock terminal of the resistor 31b is generated by a state machine which controls iteration operation of the circuit, and becomes active only one time after the acceptance or rejection on state transition is determined in one iteration.

The cycle number of clock signals CLK used to determine the acceptance or rejection and update each parameter varies depending on the determination result on the acceptance or rejection. Thus, the pulse signal is generated so as to have the cycle number.

The following description will be made for a case where five cycles of the pulse signal are generated in one iteration when the state is updated, and one cycle of the pulse signal is generated in one iteration when the state is not updated.

Figure 8:
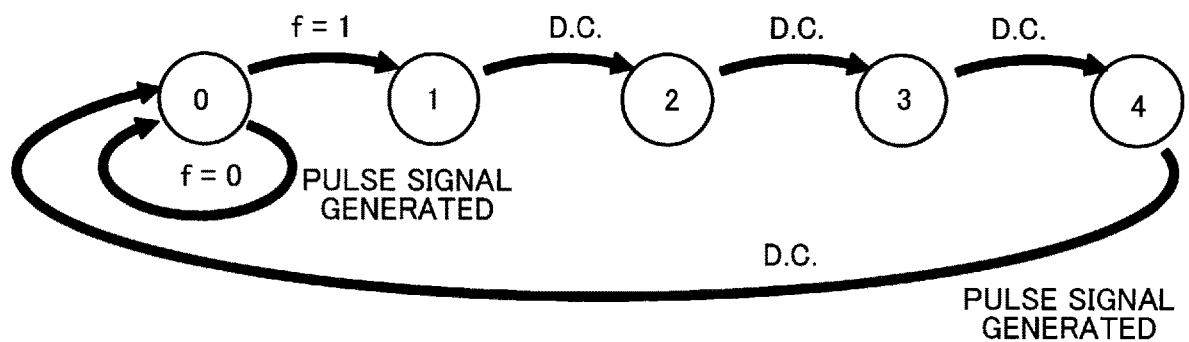
FIG. 8 is a state transition diagram illustrating one example of state transitions for generating pulse signals.

FIG. 8 is a state transition diagram illustrating one example of state transitions for generating pulse signals.

As illustrated in FIG. 8, the state transitions are performed through five states, 0 to 4. In the state 0, when the transition acceptance f is 0, a pulse signal is generated. In this case, any transition from the state 0 is not performed. In the state 0, when the transition acceptance f is 1, the state transitions to the state 1. In FIG. 8, a symbol D.C. means "don't care". That is, the state 1 will transition to the state 2, 3, and 4 regardless of the value of the transition acceptance f, in synchronization with the clock signal CLK; and returns to the state 0. When the state returns from the state 4 to the state 0, pulse signals are generated.

The state machine to achieve such state transitions may be a circuit which operates depending on a truth table of FIG. 9.

FIG. 9 illustrates one example of the truth table of a logic circuit for generating the pulse signals.

Figure 10:
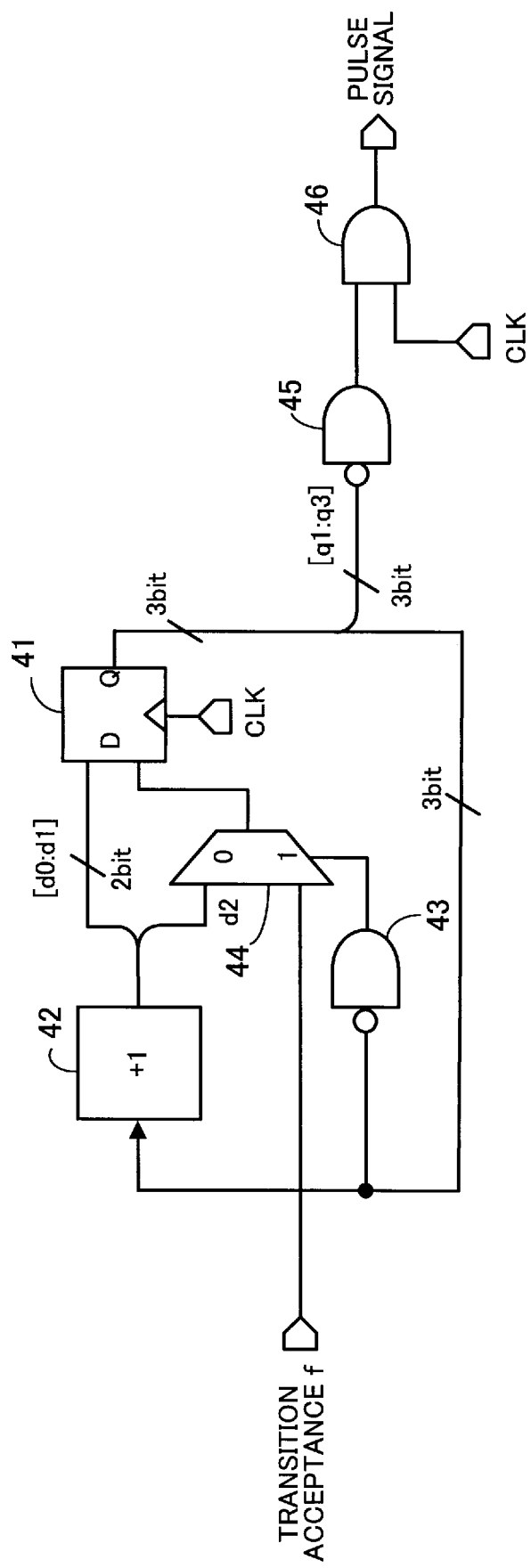
FIG. 10 illustrates one example of a state machine for generating the pulse signals.

FIG. 10 illustrates one example of a state machine for generating the pulse signals.

A state machine 40 includes a 3-bit flip-flop 41, an increment circuit 42, an AND circuit 43, a selector 44, and AND circuits 45 and 46. The truth table of FIG. 9 indicates the relationship between output values, Q1, Q2, and Q3, and input values, D1, D2, and D3, of the 3-bit flip-flop 41 in each state.

The higher-order two bits ([d0:d1]) of three bits outputted by the increment circuit 42, and a value outputted by the selector 44 are supplied to the 3-bit flip-flop 41 as the input values D1 to D3. The 3-bit flip-flop 41 receives the input values, D1 to D3; and outputs the resulting values as the output values Q1 to Q3, at a timing in synchronization with the clock signal CLK.

The increment circuit 42 increments the output values Q1 to Q3, outputted by the 3-bit flip-flop 41, by 1. For example, when the output values Q1 to Q3 are "001" (that is, Q1=0, Q2=0, and Q3=1), the increment circuit 42 outputs "010".

The AND circuit 43 inverts the logic bit levels of the output values Q1 to Q3, and outputs a logical AND of the inverted logic bit levels as an output value.

One input terminal of the selector 44 receives the least significant bit d2 of the three bits outputted by the increment circuit 42, and the other input terminal receives the transition acceptance f. The selector 44 outputs the transition acceptance f if the output value from the AND circuit 43 is 1, and outputs d2 if the output value from the AND circuit 43 is 0.

The AND circuit 45 inverts the three-bit ([q1:q3]) logic levels of the output values Q1 to Q3, and outputs a logical AND of the inverted three-bit logic levels as an output value.

The AND circuit 46 outputs a logical AND of the clock signal CLK and the output value outputted by the AND circuit 45, as the pulse signal.

Thus, the pulse signal is generated by the above-described state machine 40.

In FIG. 7, the comparator 32 outputs a comparison result obtained by comparing the energy change $-\Delta E$ and the threshold A. The comparator 32 outputs 1 when the energy change $-\Delta E$ is larger than the threshold A, and outputs 0 when the energy change $-\Delta E$ is equal to or smaller than the threshold A.

Hereinafter, an example of operation of the optimization apparatus of the second embodiment will be described.

The random-number generation circuit 14$b$1 generates one number (transition number N) of a state transition candidate, as a random number, in each of the above-described iterations. The selector 14$b$2 selects and outputs an energy change $-\Delta E$ of a state transition corresponding to the transition number N. The multiplier 14$b$4 multiplies a value, which is obtained by using the noise table 14$b$3 and converting the uniform random number, with the temperature T; and thereby generates a threshold of the thermal excitation energy in Metropolis method or Gibbs method. The subtractor 21$a$ subtracts the offset y outputted by the accumulator 22$a$, from the thermal excitation energy threshold. The comparator 14$b$5 compares the subtraction result outputted by the subtractor 21$a$ and the energy change $-\Delta E$ selected and outputted by the selector 14$b$2, and thereby determines the acceptance or rejection on state transition.

The comparator 32 outputs 1 when the energy change $-\Delta E$ is larger than the threshold A, and outputs 0 when the energy change $-\Delta E$ is equal to or smaller than the threshold A.

The accumulator 22$a$ resets the offset y to zero when the energy change $-\Delta E$ is larger than the threshold A, and adds the offset increment $\Delta y$ to the offset y when the energy change $-\Delta E$ is equal to or smaller than the threshold A. In the latter case, since the offset $\Delta y$ is added to the offset y, the offset y is controlled so as to monotonously increase in a stay time in a current state; in addition, even when a state transition occurs, the offset y continuously increases if the energy change $-\Delta E$ caused by the state transition is equal to or smaller than the threshold. Thus, even when the local minimums as illustrated in FIG. 5 exist, the escape facilitating function, which uses the offset and allows the state to escape from a local minimum, functions.

The criterion for determining the offset increment $\Delta y$ is given as follows.

As described above, to obtain the acceleration effect without adversely affecting the convergence, the offset increment $\Delta y$ is desirably determined so that the stay time at a local minimum is about several times the stay time at a solution other than the local minimum. In the case where one state-transition candidate occurs in each iteration as is in the present embodiment, the probability at which one state transition is determined as a candidate is the inverse of the number of all state transitions. Thus, the offset increment $\Delta y$ is desirably determined so that when the stay time at a local minimum is about several times the stay time at a solution other than the local minimum, the offset y has energy enabling the escape from the local minimum.

The other operations of the transition control unit 30 are the same as those of the transition control unit 20 of the first embodiment, and thus the optimization apparatus of the second embodiment produces the same effect as that by the optimization apparatus of the first embodiment.

Third Embodiment

Figure 11:
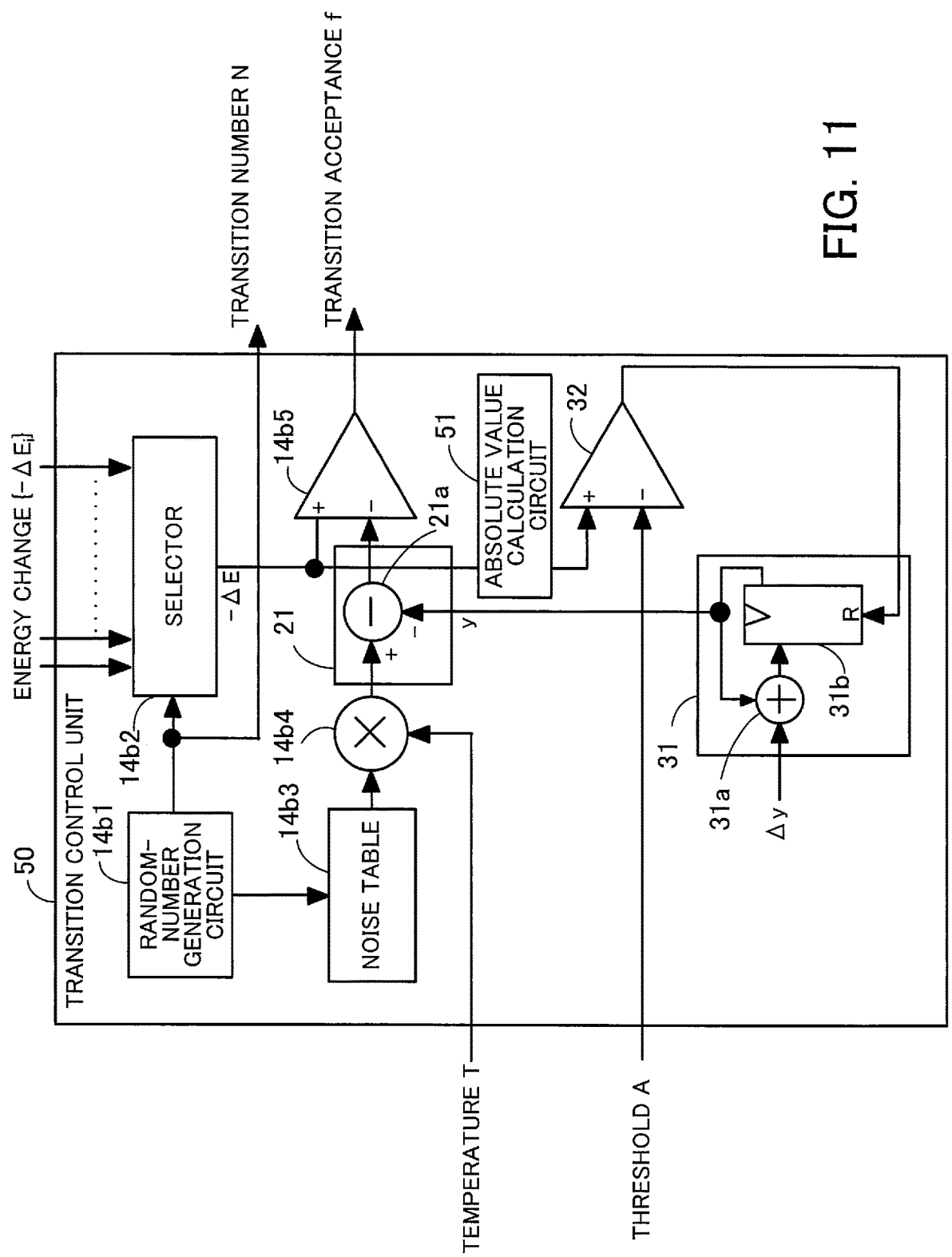
FIG. 11 illustrates one example of a circuit configuration of a transition control unit of an optimization apparatus of a third embodiment.

FIG. 11 illustrates one example of a circuit configuration of a transition control unit of an optimization apparatus of a third embodiment. The same components as those of the transition control unit 30 illustrated in FIG. 7 are given the same reference symbols. A transition control unit 50 of FIG. 11 includes an absolute value calculation circuit 51. The absolute value calculation circuit 51 and the comparator 32 may be replaced by a coincidence determination circuit including, for example, an XOR circuit, if the energy change $-\Delta E$ is a discrete value, and if an operation to obtain an absolute value and determine whether the absolute value is equal to or smaller than the threshold A is substantially the same as an operation to determine whether the energy change $-\Delta E$ is zero.

The absolute value calculation circuit 51 calculates the absolute value of the energy change $-\Delta E$ outputted by the selector 14$b$2, and outputs the calculated absolute value to the comparator 32.

With this operation, when the energy change with respect to zero is equal to or smaller than the threshold A, the comparator 32 outputs 0 and does not reset the offset y, regardless of whether the energy change $-\Delta E$ is positive or negative. That is, when the energy change with respect to zero is equal to or smaller than the threshold A, the transition control unit 50 determines that the state stays at a local minimum, and continuously increases the offset y. Thus, even when the local minimums as illustrated in FIG. 5 exist, the escape facilitating function, which uses the offset and allows the state to escape from a local minimum, functions to shorten the calculation time of an optimization problem to be solved.

The absolute value calculation circuit 51 may detect the (positive or negative) sign of the energy change $-\Delta E$ by checking the most significant bit of the energy change $-\Delta E$. In this case, when the energy change $-\Delta E$ is positive, the absolute value calculation circuit 51 may directly output the energy change $-\Delta E$; when the energy change $-\Delta E$ is negative, the absolute value calculation circuit 51 may calculate two's complements to the energy change $-\Delta E$ and output the calculated values.

Figure 12:
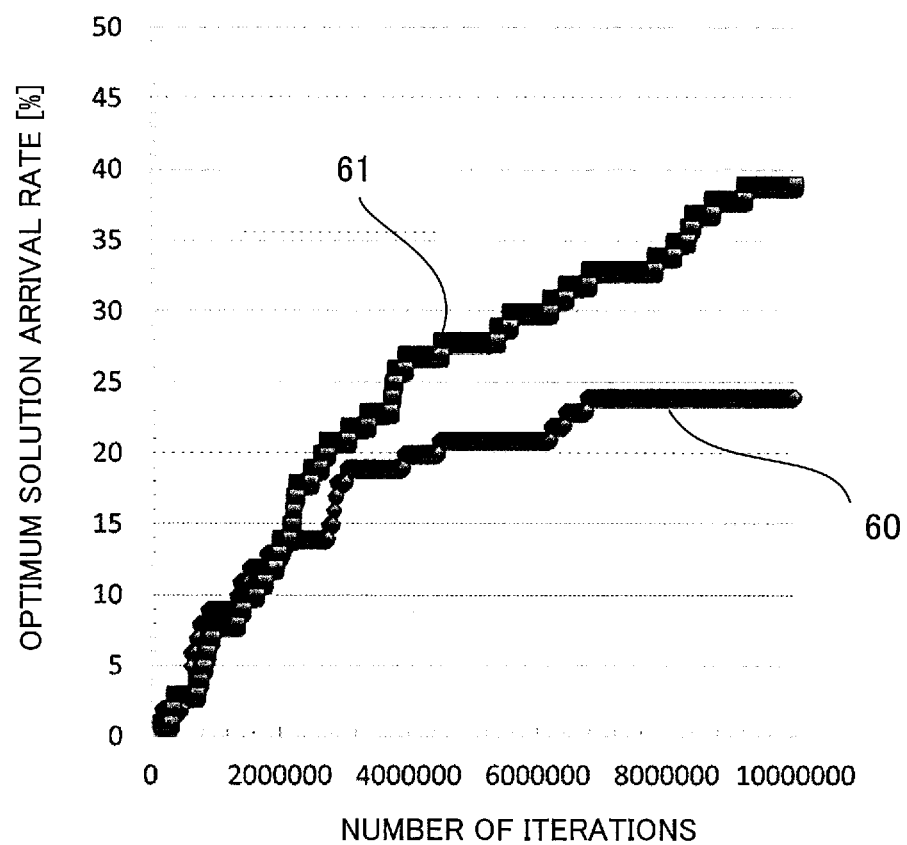
FIG. 12 illustrates one example of a software simulation result of simulated annealings performed by using the transition control units of FIG. 4 and FIG. 11.

FIG. 12 illustrates one example of a software simulation result of simulated annealings performed by using the transition control units of FIG. 4 and FIG. 11. The optimization problem was a maximum cut problem which had been formulated by using Ising model (Boltzmann machine). The vertical axis represents the optimum-solution arrival rate

[%] (rate at which the optimum solution was obtained), and the horizontal axis represents the number of iterations.

A result 60 indicates the relationship between the number of iterations and the optimum-solution arrival rate, obtained when the transition control unit 20a of FIG. 4 was used. A result 61 indicates the relationship between the number of iterations and the optimum-solution arrival rate, obtained when the transition control unit 50 of FIG. 11 was used and the threshold A was zero.

In FIG. 12, the optimum-solution arrival rate obtained when the transition control unit 50 was used increases by about 60%, at the number of iterations of 10,000,000, with respect to the optimum-solution arrival rate obtained when the transition control unit 20a was used. That is, it is understood that the transition control unit 50 allows the state to reach an optimum solution with less number of iterations than the transition control unit 20a.

Some aspects of the optimization apparatus and the method of controlling the optimization apparatus have been described with reference to some embodiments. However, these embodiments are merely examples, and thus the present disclosure is not limited to these embodiments.

In one aspect, a calculation time of an optimization problem is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
    a state holding unit configured to hold values of a plurality of state variables included in an evaluation function that expresses energy;
    an energy calculation unit configured to calculate a change in the energy for each of a plurality of state transitions that is caused by change in any of the plurality of state variables;
    a temperature control unit configure to control a temperature; and
    a transition control unit configured to add an offset to the change, when stochastically determining based on the temperature, the change, and a random number whether to accept one of the plurality of state transitions depending on a relative relationship between the change and thermal excitation energy, control the offset so as to be larger at a local minimum, at which the energy is locally minimized, than at a solution at which the energy is not minimized, and reset the offset to zero when the change is larger than a first threshold.

2. The optimization apparatus according to claim 1, wherein the transition control unit is configured to reset the offset to zero when an absolute value of the change is larger than the first threshold.

3. The optimization apparatus according to claim 1, wherein the transition control unit includes:
    a selector configured to select based on the random number one of changes in the energy having been calculated for the plurality of state transitions;
    a storing unit configured to output a value of an inverse function to a function that expresses an acceptance probability of each of the plurality of state transitions according to the random number, the function being expressed by using Metropolis method or Gibbs method;
    a multiplier configured to output a second threshold of the thermal excitation energy that is a product of the value of the inverse function and the temperature;
    a comparator configured to output a first determination result indicating whether to accept a state transition corresponding to the one of the changes selected by the selector, the first determination result being expressed by a value corresponding to a comparison result obtained by comparing a sum of the offset and the one of the changes with the second threshold of the thermal excitation energy;
    a determination circuit configured to output a second determination result indicating whether the one of the changes or an absolute value of the one of the changes is larger than the first threshold; and
    an offset control circuit configured to reset the offset to zero when the second determination result indicates that the one of the changes or the absolute value of the one of the changes is larger than the first threshold, and configured to increase the offset at first intervals, when the second determination result indicates that the one of the change or the absolute value of the one of the changes is equal to or smaller than the first threshold, such that the offset is monotonously increased during a stay time at a current state expressed with the plurality of state variables.

4. The optimization apparatus according to claim 3, wherein
    the offset control circuit further includes an accumulator having a reset terminal to which the second determination result is outputted, and
    the accumulator resets the offset to zero when the second determination result indicates that the one of the changes or the absolute value of the one of the changes is larger than the first threshold, and adds an offset increment to the offset when the second determination result indicates that the one of the changes or the absolute value of the one of the changes is equal to or smaller than the first threshold.

5. A method of controlling an optimization apparatus, the method comprising:
    holding, by a state holding unit of the optimization apparatus, values of a plurality of state variables included in an evaluation function that expresses energy;
    calculating, by an energy calculation unit of the optimization apparatus, a change in the energy for each of a plurality of state transitions that is caused by change in any of the plurality of state variables;
    controlling, by a temperature control unit of the optimization apparatus, a temperature; and
    adding, by a transition control unit of the optimization apparatus, an offset to the change when stochastically determining based on the temperature, the change, and a random number whether to accept one of the plurality of state transitions depending on a relative relationship between the change and thermal excitation energy, controlling the offset so as to be larger at a local minimum, at which the energy is locally minimized, than at a solution at which the energy is not minimized, and resetting the offset to zero when the change is larger than a threshold.

\* \* \* \* \*